(12) United States Patent
Scalf

(10) Patent No.: US 12,071,775 B2
(45) Date of Patent: Aug. 27, 2024

(54) JOIST SYSTEMS AND METHODS

(71) Applicant: Southeast Woodwork Company, Inc., Huntsville, AL (US)

(72) Inventor: Phil Scalf, Huntsville, AL (US)

( * ) Notice: Subject to any disclaimer, the term of this patent is extended or adjusted under 35 U.S.C. 154(b) by 0 days.

(21) Appl. No.: 17/347,906

(22) Filed: Jun. 15, 2021

(65) Prior Publication Data

US 2022/0396957 A1 Dec. 15, 2022

(51) Int. Cl.
*E04G 21/18* (2006.01)
*E04B 5/12* (2006.01)
*E04B 5/14* (2006.01)

(52) U.S. Cl.
CPC ............. *E04G 21/185* (2013.01); *E04B 5/14* (2013.01); *E04B 5/12* (2013.01)

(58) Field of Classification Search
CPC ...... E04B 2001/2644; E04B 5/12; E04B 5/14; E04B 5/185; E04G 21/185; E04G 23/024
See application file for complete search history.

(56) References Cited

U.S. PATENT DOCUMENTS

| | | | | |
|---|---|---|---|---|
| 3,623,755 A * | 11/1971 | Ratliff, Jr. | ................ | F16B 2/08 403/345 |
| 5,813,181 A * | 9/1998 | Ashton | ..................... | E04H 9/14 403/217 |
| 6,158,188 A * | 12/2000 | Shahnazarian | ....... | E04B 1/2604 52/702 |
| 6,425,220 B1 * | 7/2002 | Ashton | ................... | E04H 9/021 403/217 |
| 6,862,854 B1 * | 3/2005 | Fitzmyers | ........... | E04G 23/0218 403/219 |
| 7,117,648 B1 * | 10/2006 | Pryor | .................. | E04G 23/0237 52/698 |
| 8,555,597 B2 * | 10/2013 | Walther | .................. | E04B 1/003 52/703 |
| 2002/0005022 A1 * | 1/2002 | Matthews | ................. | E04B 5/10 52/696 |

FOREIGN PATENT DOCUMENTS

AU 2021101938 A4 * 7/2021

* cited by examiner

*Primary Examiner* — Christine T Cajilig
(74) *Attorney, Agent, or Firm* — Dennen IP Law, LLC

(57) ABSTRACT

A flooring system has at least one girder, a first joist coupled to a first side of the girder, and a second joist coupled to a second side of the girder. The flooring system further comprises a joist tightening system that has a first end coupled to the first joist and a second end coupled to the second joist, the joist tightening system pulls the first joist and the second joist toward the girder thereby tightening the first joist and the second joist.

6 Claims, 2 Drawing Sheets

JOIST SYSTEMS AND METHODS

BACKGROUND

Some floors are built on a concrete slab flat on the ground. However, other floors are raised above the ground. The raised floor allows for access to heating equipment, insulation, plumbing, wiring, and other mechanical equipment.

A raised floor is constructed with a wooden framework that bridges from one exterior wall to another. This frame may or may not be supported intermediately by girders, beams, or walls.

The floor's framework is made up of wooden joists that run parallel to one another at regular intervals. The joists are spliced over beams or other supports. Typically, the joists are butted end-to-end at the beams or other supports. The joists may be connected one to the other with plywood gusset plates or lapped and secured with nails or bolts.

Notably, the subflooring of the frame is built atop the joists. A subflooring can include sub-flooring sheets of wood and a decorative finish atop the sheets of wood. For example, tile may be installed on the sub-flooring sheets or hardwood may be installed on the sub-flooring sheets.

Often, the joists beneath the sub-flooring move or separate one from the other. When this occurs, the finished flooring coupled to the sub-flooring may be affected. For example, joists may separate causing the hardwood installed on the sub-flooring to separate. When the hardwood separates, the separation may leave a crevasse in the wood flooring. Similarly, when the tile separates, the separation may leave a crevasse in the tile flooring.

BRIEF DESCRIPTION OF DRAWINGS

The disclosure can be better understood referencing the following drawings. The elements of the drawings are not necessarily to scale relative to each other, emphasis instead being placed upon clearly illustrating the principles of the disclosure. Furthermore, like reference numerals designate corresponding parts throughout the several views.

BRIEF DESCRIPTION

The present disclosure describes a joint system and method in accordance with an embodiment of the present disclosure. The joint system comprises a plurality of joists that are spliced at a girder. A tightening bar is coupled to a joist, traverses through a girder, and is coupled to the complementary joist on the other side of the girder. The tightening bar comprises threaded L-joints, and a threaded bar is coupled to each of the threaded L-joints. To tighten the joists, one uses a wrench and turns the threaded bar that engages the threads in the L-joints thereby pulling the joists closer together and tightening up against the girder.

Figure 1:
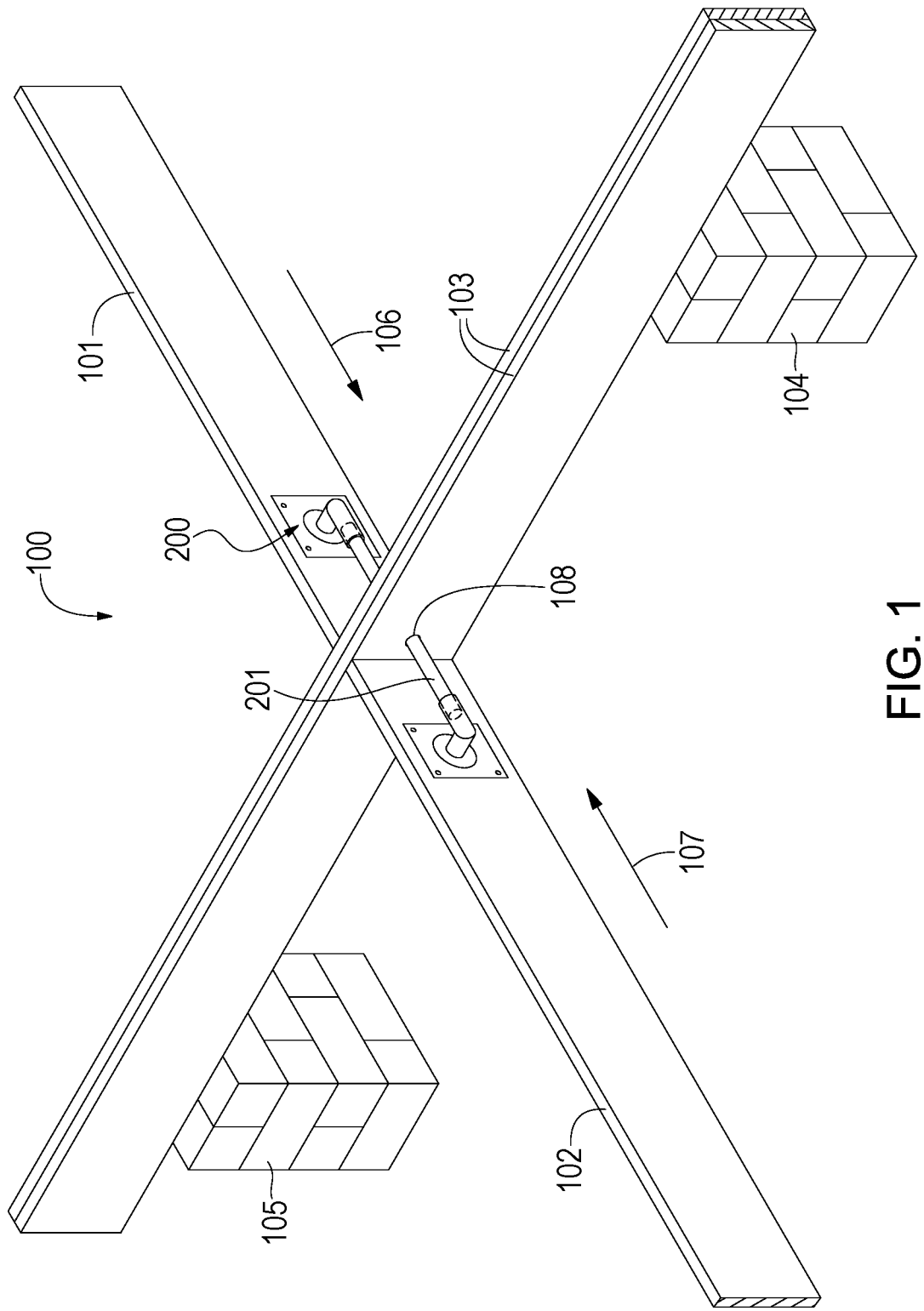
FIG. 1 is a joist system in accordance with an embodiment of the present disclosure.

FIG. 1 is a joist system 100 in accordance with an embodiment of the present disclosure. The joist system 100 comprises a girder 103 that is supported by one or more piers 104 and 105. The girder 103 is the main horizontal support of the joist system 100.

Note that the piers may be implemented in any number of ways. For example, the piers can rest on spot footings or a continuous footing. The location of the piers often is determined by the location of load bearing walls.

Perpendicular to the girder 103 is a joist 101 and a joist 102. The joists 101 and 102 are coupled to the girder via a bracket, for example. Thus, the joists 101 and 102 are supported by the girder 103.

The joist system 100 further comprises a joist tightening system 200. In operation, the joist tightening system 200, when actuated, pulls joist 101 toward the girder 103 in a direction indicated by reference arrow 106. Further, the tightening system, when actuated, pulls joist 102 toward the girder 103 in a direction indicated by reference arrow 107. Further, a joist tightening bar 201 of the joist tightening system 200 traverses through an opening 108 in the girder 103.

When the joists 101, 102 are pulled together by the joist tightening system 200, it may have a curative effect on a flooring installed on a sub-flooring that may have separated, as described hereinabove. Further, it may have a prophylactic effect so that the flooring installed on the sub-flooring does not separate.

Figure 2:
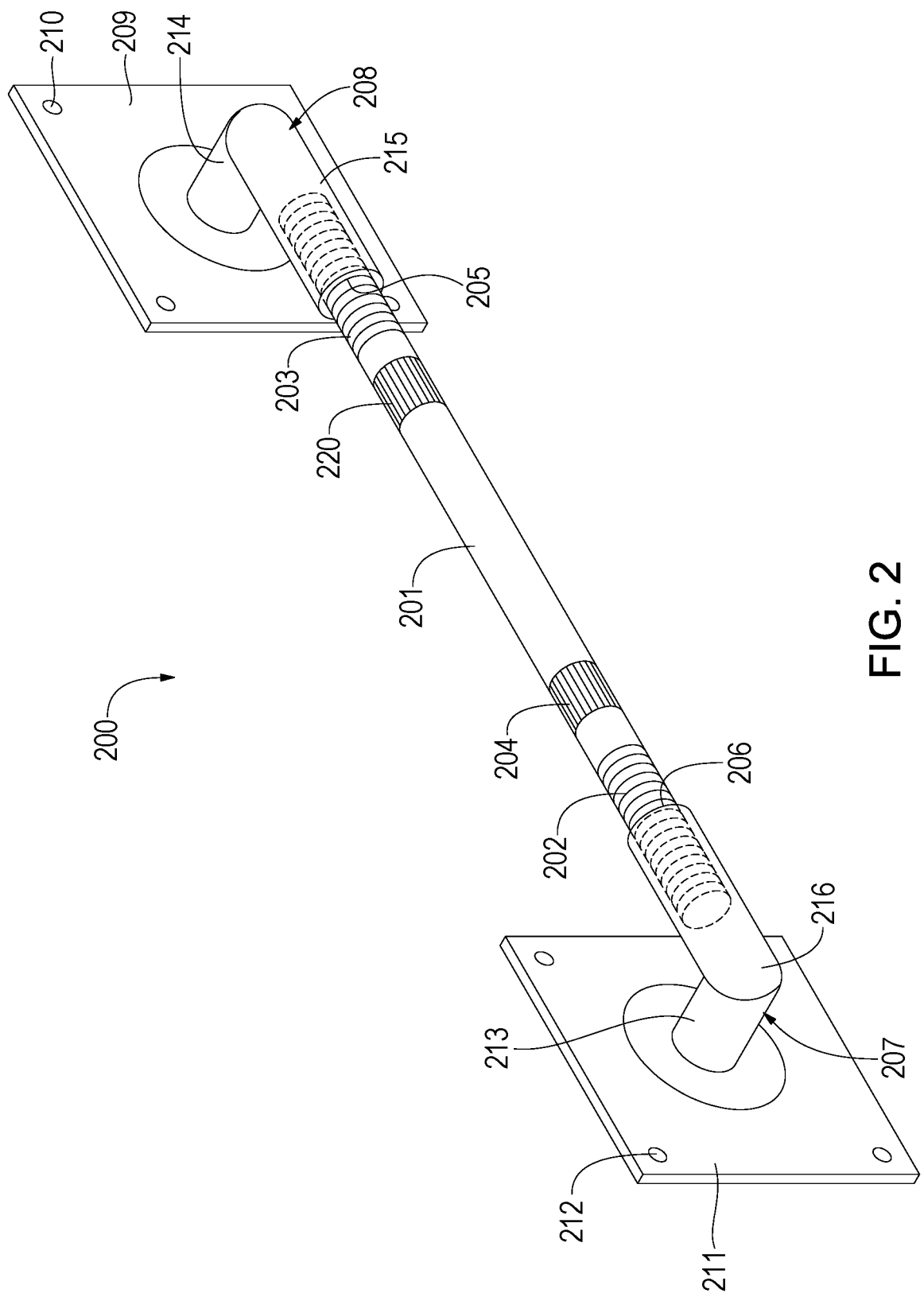
FIG. 2 is a tightening system installed on joists of the joist system of FIG. 1.

FIG. 2 is the joist tightening system 200 in accordance with an embodiment of the present disclosure. The joist tightening system 200 comprises two plates, plate 211 and plate 209. The plates 211, 209 are fixedly coupled to the joists 102, 101 (FIG. 1), respectively, via a plurality of fasteners 212 and 210, respectively.

The plate 211 is substantially square. Fixedly coupled to the substantially square plate 211 is an L-bracket 207.

The plate 209 is substantially square. Fixedly coupled to the substantially square plate 209 is an L-bracket 209.

The L-bracket 207 comprises a short member 213 that is coupled to the square plate 211. Further, the L-bracket 207 has a long member 216 that is longer than the short member 213. At an end of the long member 216 is a threaded opening 206.

The L-bracket 208 comprises a short member 214 that is coupled to the square plate 209. Further, the L-bracket 208 has a long member 215 that is longer than the short member 214. At an end of the long member 215 is a threaded opening 205.

The joist tightening system 200 further comprises the joist tightening bar 201. The joist tightening bar 201 is substantially straight. The joist tightening bar 201 comprises a first threaded end 203. Further, the joist tightening bar 201 comprises a second threaded end 202.

Note that as shown in FIG. 1, the joist tightening bar 201 traverses through an opening in the girder 103 (FIG. 1). The first threaded end 203 threadedly couples to the threaded opening 205 in the L-bracket 208. Also, the second threaded end 202 threadedly couples to the threaded opening 206 in the L-bracket 207.

In operation, the threaded ends 202, 203 are inserted into the threaded openings 206, 205, respectively. To tighten the joists 101, 102 (FIG. 1), a contractor may grasp a wrench shaped section 204 or 220 with a wrench (not shown), turn the wrench, and tighten the joists 101, 102. Tightening with a wrench may have a curative effect on a flooring installed on a sub-flooring that may have separated, as described hereinabove. Further, it may have a prophylactic effect so that the flooring installed on the sub-flooring does not separate.

The invention claimed is:

1. A flooring system, comprising: at least one girder;
a first joist coupled to a first side of the girder;
a second joist coupled to a second side of the girder; and
a joist tightening system having a first end coupled to the first joist and a second end coupled to the second joist, the joist tightening system configured to pull the first joist and the second joist toward the girder thereby tightening the first joist and the second joist, wherein the first joist and the second joist are coupled to the girder via brackets, the joist tightening system comprises a bar wherein a first end of the bar is threaded and a second end of the bar is threaded, the joist tightening system comprises a first bracket coupled to a first plate, and the first plate is coupled to the first joist and comprises a second bracket coupled to a second plate, and the second plate is coupled to the second joist, and the joist tightening system comprises a second bracket coupled to a second plate.

2. The flooring system of claim 1, wherein the bar is threadedly coupled on a second to a threaded opening in the second bracket.

3. The flooring system of claim 2, wherein the bar comprises wrench-shaped receivers.

4. The flooring system of claim 3, wherein if a wrench is moveably coupled to the bar at the wrench-shaped receivers, the bar is turned, and the joists move toward the girder thereby tightening the joists.

5. A flooring method, comprising:
attaching a first joist to a girder;
attaching a second joist to a girder;
inserting a joist tightening system through the girder;
attaching a first end of the joist tightening system to the first joist; attaching a second end of the joist tightening system to the second joist; pulling the first joist and the second joist toward the girder via the joist tightening system
coupling the first joist and the second joist to the girder via brackets;
inserting a bar through the girder;
threadedly coupling the first end of the bar to an L-bracket coupled to the first joist;
threadedly coupling the second end of the bar to an L-bracket coupled to the second joist;
coupling the L-bracket to the first joist via a first plate;
coupling the L-bracket to the second joist via a second plate; and
threadedly coupling a first end of the bar to a threaded opening in the first bracket.

6. The flooring method of claim 5, further comprising threadedly coupling a second end of the bar to a threaded opening in the second bracket.

* * * * *